May 23, 1933.    W. VAN B. ROBERTS    1,910,058
CASCADE SUPERREGENERATIVE CIRCUITS
Filed June 12, 1931
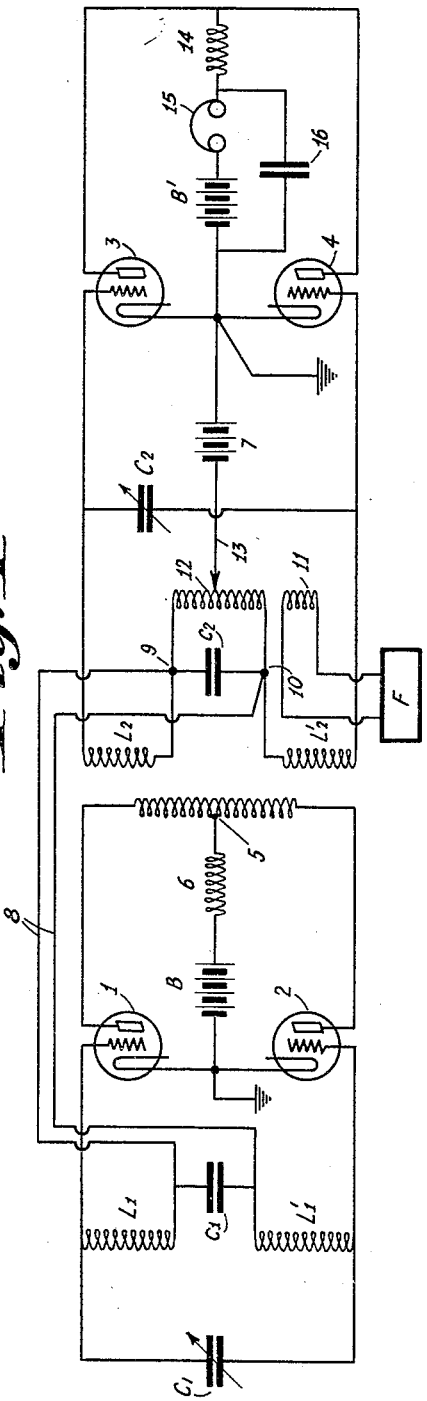
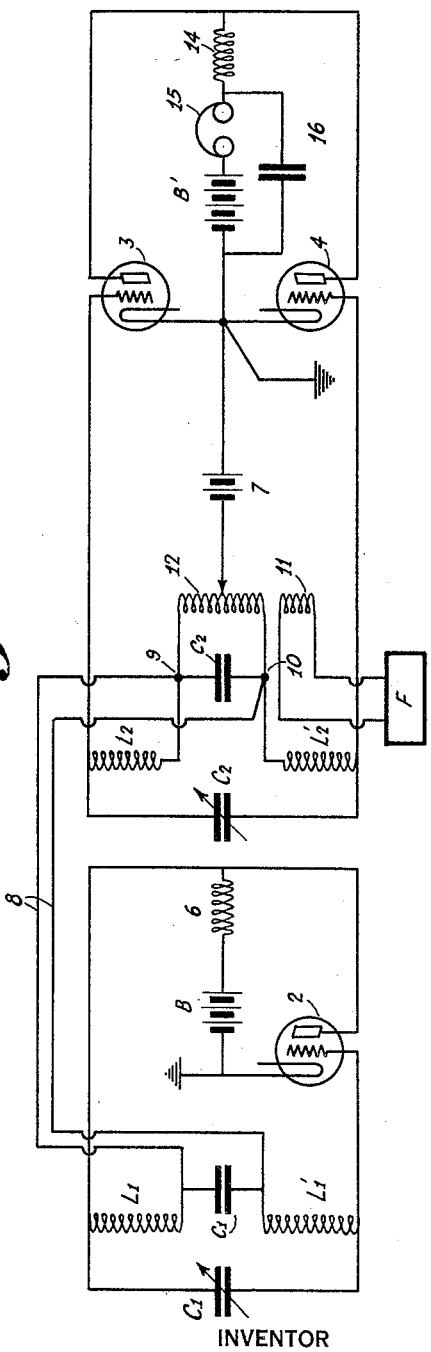
INVENTOR
WALTER VAN B. ROBERTS
BY
ATTORNEY Patented May 23, 1933

1,910,058

UNITED STATES PATENT OFFICE

WALTER VAN B. ROBERTS, OF PRINCETON, NEW JERSEY, ASSIGNOR TO RADIO CORPORATION OF AMERICA, A CORPORATION OF DELAWARE

CASCADE SUPERREGENERATIVE CIRCUITS

Application filed June 12, 1931. Serial No. 543,922.

My present invention relates to super-regenerative receivers, and more particularly to receivers embodying super-regenerative circuits in cascade.

In my co-pending application Serial No. 351,411 filed March 30, 1929, there has been disclosed and claimed a super-regenerative receiver including a pair of oppositely connected space discharge tubes, the common output circuit of the tubes being coupled in a certain manner to the common input circuit, while a source of interrupting current was differentially coupled to the said input circuit. Briefly, the coupling between the output and input circuits was such as to secure periodic reversal of phase of the feed-back to the input circuit, with the result that rapid quenching of radio frequency oscillations was secured during the damping period without introducing appreciable damping into the signal oscillation circuit during regenerative periods.

Further improvements of this arrangement were disclosed in my co-pending application Serial No. 543,925 filed June 12, 1931. These improvements utilize a differential coupling between the signal circuit and the common input circuit of the oppositely connected tubes so as to provide a balanced modulator action. In other words, when no signals are impressed on the signal circuit, there occurs a balancing of both signal frequency and of interrupting current energy in the common output circuit of the tubes. This results in an economical arrangement, and permits the use of an interrupting current of audible frequency, as for example 6000 cycles.

When it is attempted to employ tuned stages of super-regeneration in cascade difficulties are encountered. For example, unless the tuned circuit in a preceding stage of super-regeneration is damped simultaneously with the tuned oscillation circuit in a succeeding stage, the latter is influenced by the preceding undamped tuned circuit.

Accordingly, I have devised a method of and provided a means for, simultaneously damping the tuned circuits of cascade super-regenerative circuits with the result that arrangements as shown in my aforementioned co-pending applications may be readily employed for cascade amplification, or coupled circuit selectivity.

It may, therefore, be stated that it is one of the main objects of my present invention to provide a method of receiving modulated signal energy which consists in collecting such signals in a preceding resonant circuit, electro-magnetically transmitting the collected signals to a succeeding resonant circuit having a periodically positive and negative characteristic, and inserting positive resistance in each resonant circuit for quenching persistent oscillations simultaneously with introduction of positive resistance in the succeeding resonant circuit.

Other important objects of the preset invention are to improve generally the efficiency of super-regenerators, and to particularly provide a cascade tuned super-regenerative receiver which is not only reliable in operation, but economically manufactured and assembled.

The novel features which I believe to be characteristic of my invention are set forth in particularity in the appended claims, the invention itself, however, as to both its organization and method of operation will best be understood by reference to the following description taken in connection with the drawing in which I have indicated diagrammatically several circuit organizations whereby my invention may be carried into effect.

In the drawing,

Fig. 1 diagrammatically illustrates a receiving circuit embodying the present invention.

Fig. 2 shows a circuit including a modified form of the invention.

Referring to the accompanying drawing wherein like characters of reference designate like elements in the different figures, there is shown in Fig. 1 a receiving circuit embodying a plurality of tuned super-regenerative stages of amplification in cascade. The second stage of amplification essentially comprises a pair of space discharge tubes 3, 4 oppositely connected, and has been fully described in my aforementioned latter co-pending application Serial No. 543,925. The common input circuit of the two tubes includes an inductance coil split into two portions $L_2$ and $L'_2$.

A fixed capacity $c_2$ is connected in series, and between points 9, 10 with the aforementioned coil portions. An inductance coil 12 is connected in shunt relation with the fixed capacity $c_2$, the circuit including the coil 12 and condenser $c_2$ being maintained fixedly tuned to the frequency of the interrupting current. The latter current is impressed upon this latter circuit by means of a source F adapted to produce audio frequency oscillations, as for example, of 6000 cycles.

The interrupting frequency oscillations are impressed upon the circuit including the coil 12 by means of a coil 11 inductively coupled with the coil 12. In view of the fact that the nature of the source F is not a part of the present invention, and is well known to those skilled in the art, the details of the same are not shown. A variable tuning condenser $C_2$ is shunted across the coils $L_2$, $L'_2$, and is adapted to tune the split coil to a desired signal frequency.

The common cathode lead of the tubes 3, 4 is grounded, and, also, connected to the positive terminal of a grid bias source 7, the negative terminal of the latter being in adjustable contact with the coil 12 by means of a sliding contact member 13. The common output circuit of the two tubes 3, 4 includes a source of anode potential B' whose negative terminal is connected to the grounded, common, cathode lead of the tubes. The positive terminal is connected in series with a utilization means 15, such as a pair of head phones, and an inductance coil 14. A radio frequency by-pass condenser 16 is shunted across the source B' and the utilization means 15.

As has been explained in my latter co-pending application Serial No. 543,925, the coil 14 is coupled with the coil portions $L_2$, $L'_2$, so that there occurs a periodical reversal of the phase of feed-back from the common output circuit of the tubes 3, 4 to the common input circuit of the latter. The circuit including the inductance 12 and the capacity $c_2$ is maintained fixedly tuned to the audible interrupting frequency from the source F, so that when the grid of tube 3 is less negative than normal the grid of tube 4 is more negative than normal.

While the grid of tube 4 is very negative, the tube 4 is ineffective. But, it should be noted that the grid of tube 3 is only slightly negative, and, due to the action of feed-back coil 14 and coil $L_2$, tube 3 builds up oscillations in the tuned radio frequency circuit, the amplitude at a given time depending upon the signal input. Suppose now the grid of tube 3 becomes very negative, while the grid of tube 4 becomes only slightly negative. This results in the coil 14 acting in a reversed feed-back fashion; that is to say, it functions positively to quench the oscillations, by virtue of its coupling with the coil $L_2$, $L'_2$, thus introducing effective positive ohmic resistance.

While my co-pending application Serial No. 351,411 disclosed this phenomenon produced by a pair of independent feed-back coils employed for the regenerative and damping functions, a circuit employing a single coil in the common output circuit, and as shown in Fig. 1, has been disclosed in my aforementioned latter co-pending application Serial No. 543,925. It will, also, be noted that the tuned radio frequency oscillation circuit comprising the coil portions $L_2$, $L'_2$ and the tuning condenser $C_2$ are differentially connected to the common input circuit of the tubes 3, 4 while the interruption current is also differentially applied to the common input circuit of the tubes. In this way, as explained heretofore, a balanced modulator action is obtained, and an interruption current of audible frequency can be efficiently employed.

When it is desired to connect an additional stage of tuned super-regenerative amplification to the tuned input and output circuit of the stage of amplification just described, I have found that unless the tuned circuit of this additional stage is damped simultaneously with the tuned circuit of the stage just described, the damped oscillation circuit of this latter stage is influenced by the undamped tuned circuit of the preceding stage. A means must, therefore, be employed to simultaneously damp both tuned circuits of the super-regenerative stages connected in cascade.

Accordingly, in Fig. 1 there is shown a preceding tuned stage of super-regenerative amplification comprising a pair of oppositely connected space discharge tubes 1, 2 having its common output circuit coupled to the split coil of the tuned circuit of the succeeding stage by an inductance coil 5, the coil 5 being inductively coupled with each coil portion $L_2$ and $L'_2$. A source of anode potential B and an inductance coil 6, both connected in series, are connected between the mid-point of the coil 5 and the grounded, common, cathode lead of the tubes 1, 2.

The common input circuit of the two tubes includes a split inductance coil comprising the portions $L_1$, $L'_1$, both portions being connected in series with a fixed condenser $c_1$. The opposite terminals of the condenser are connected by leads 8 to the points 9, 10 in the succeeding stage of amplification. A variable tuning condenser $C_1$ is connected in shunt relation with the split coil, and it is to be understood that the coil 6 is coupled with the coil portions $L_1$ and $L'_1$ in the same manner and for the same purposes, as was explained in connection with the corresponding coil 14 in the succeeding stage of amplification.

It will be noted that the source F simultaneously applies interrupting current at an audible frequency, to the common input circuits of both stages, the coil 12 functioning with the condenser $c_1$, to provide a circuit in the first stage fixedly tuned to the interrupting frequency. It will, also, be seen that whenever the coil 14 functions, in the succeeding stage, to introduce a positive resistance effect in the tuned circuit of the succeeding stage, simultaneously, oscillations are damped in the preceding stage in the same manner by the action of coil 6 which is coupled to $L_1, L'_1$. Thus, each stage is operating in the super-regenerative manner, and the coupling between stages provided by the coupling between coils 5 and coil $L_2, L'_2$ is such as to impress the super-regeneratively amplified signal frequency upon the second stage.

The arrangement shown in Fig. 1 is particularly adapted for securing cascade super-regeneration. If it is desired to secure coupled circuit selectivity, the arrangement shown in Fig. 2 may be employed. The arrangement is substantially identical with that shown in Fig. 1, the similar elements being similarly designated, with the following exceptions. The tube 1, which tube produces the regenerative feed-back action between the coil 6 and the coil portion $L_1$, is omitted, as well as the output inductance coil 5.

Instead of employing electro-magnetic coupling between the two stages of super-regeneration, the tuned circuit of the preceding stage is capacitively coupled to the tuned circuit of the succeeding stage of super-regeneration by the common condensive reactances $c_1, c_2$. If desired, this coupling may be supplemented by magnetic coupling between the coils of the tuned circuits of the preceding and succeeding stages. It will be understood that the split coils $L_1, L'_1$, in both Figs. 1 and 2, function as the signal collecting means.

In the case of the arrangement shown in Fig. 2 oscillations are quenched in the tuned circuits of both stages simultaneously by degenerative feed-back, but there is no regeneration of current in the collector circuit. The collector circuit $C_1, L_1, L'_1$ merely collects the signal and passes it on, by means of the couplings above mentioned, to the tuned input of the super-regenerative receiver, thus giving improved selectivity. The introduction of effective positive resistance at interruption frequency is merely to prevent the super-regenerative system from setting up oscillations in the collector circuit which would re-excite the super-regenerative circuit at the next cycle of regeneration.

While I have indicated and described several systems for carrying my invention into effect, it will be apparent to one skilled in the art that my invention is by no means limited to the particular organization shown and described, but that many modifications may be made without departing from the scope of my invention as set forth in the appended claims.

What I claim is:

1. A method of receiving modulated signal energy which consists in collecting such signals in a preceding resonant circuit, transmitting the collected signals to a succeeding resonant circuit having a periodically positive and negative characteristic, and introducing positive resistance in each preceding resonant circuit for quenching persistent oscillations simultaneously with introduction of positive resistance in the succeeding resonant circuit.

2. A method of receiving modulated signal energy which consists in collecting such signals in a preceding resonant circuit, electromagnetically transmitting the collected signals to a succeeding resonant circuit having a periodically positive and negative characteristic, and introducing positive resistance in each preceding resonant circuit for quenching persistent oscillations simultaneously with introduction of positive resistance in the succeeding resonant circuit.

3. The method which consists in collecting signals in a tuned circuit, transferring the collected signals to a succeeding tuned circuit, periodically producing a positive and negative resistance characteristic in the second tuned circuit, and inserting positive resistance in each preceding tuned circuit for quenching persistent oscillations, simultaneously with the introduction of positive resistance in the last named circuit.

4. In a system of tuned circuits for selectively transferring signals from a collecting means to a circuit having a resistance characteristic which periodically becomes negative, the method of preventing currents built up in the tuned system at the expense of energy drawn from the negative resistance from acting like signals received from the collector, which consists in inserting positive effective resistance into said tuned circuits during the interval when the resistance of said receiving circuit is not negative.

5. An arrangement for receiving modulated signal energy comprising a resonant circuit for collecting signals, a succeeding resonant circuit, means for transmitting the collected signals to said second circuit, means for imparting a periodically positive and negative characteristic to the second circuit, and means for introducing positive resistance into the preceding resonant circuit for quenching persistent oscillations therein simultaneously with introduction of positive resistance in the said succeeding resonant circuit.

6. In combination in a radio receiver, an amplifier stage comprising a pair of tubes having a common input and output circuit, means for tuning the input circuit to a desired signal, a circuit resonant to an interruption frequency in at least one of said circuits, a source of interruption frequency coupled to said resonant circuit, means for periodically coupling the output and input circuits in a regenerative and degenerative sense, a preceding stage comprising at least one tube having a tunable input circuit and an output circuit, means for periodically coupling the output and input circuits of said one tube in a degenerative sense, and means for coupling the tunable input circuits of said two stages.

7. In combination in a radio receiver, an amplifier stage comprising a pair of tubes having a common input and output circuit, means for tuning the input circuit to a desired signal, a circuit resonant to an interruption frequency in said input circuit, a source of interruption frequency coupled to said resonant circuit, means for periodically coupling the output and input circuits in a regenerative and degenerative sense, a preceding stage comprising at least one tube having a tunable input circuit and an output circuit, means for periodically coupling the output and input circuits of said one tube in a degenerative sense, and means for coupling the tunable input circuits of said two stages.

8. In combination in a radio receiver, an amplifier stage comprising a pair of tubes having a common input and output circuit, means for tuning the input circuit to a desired signal, a circuit resonant to an interruption frequency in at least one of said circuits, a source of interruption frequency coupled to said resonant circuit, means including a single coil in the said output circuit for periodically coupling the output and input circuits in a regenerative and degenerative sense, a preceding stage comprising at least one tube having a tunable input circuit and an output circuit, means for periodically coupling the output and input circuits of said one tube in a degenerative sense, and means for coupling the tunable input circuits of said two stages.

9. In combination in a radio receiver, an amplifier stage comprising a pair of tubes having a common input and output circuit, means for tuning the input circuit to a desired signal, a circuit resonant to an interruption frequency in at least one of said circuits, a source of interruption frequency coupled to said resonant circuit, means for periodically coupling the output and input circuits in a regenerative and degenerative sense, a preceding stage comprising at least one tube having a tunable input circuit and an output circuit, means for periodically coupling the output and input circuits of said one tube in a degenerative sense, and means for capacitatively coupling the tunable input circuits of said two stages.

10. In combination in a radio receiver, an amplifier stage comprising a pair of tubes having a common input and output circuit, means for tuning the input circuit to a desired signal, a circuit resonant to an interruption frequency in at least one of said circuits, a source of interruption frequency coupled to said resonant circuit, means for periodically coupling the output and input circuits in a regenerative and degenerative sense, a preceding stage comprising at least one tube having a tunable input circuit and an output circuit, means for periodically coupling the output and input circuits of said one tube in a degenerative sense, and means for coupling the tunable input of the preceding stage to the said resonant circuit of the said amplifier stage.

11. In combination in a radio receiver, an amplifier stage comprising a pair of tubes having a common input and output circuit, means for tuning the input circuit to a desired signal, a circuit resonant to an interruption frequency in at least one of said circuits, a source of interruption frequency coupled to said resonant circuit, means for periodically coupling the output and input circuits in a regenerative and degenerative sense, a preceding stage comprising at least one tube having a tunable input circuit and an output circuit, means for periodically coupling the output and input circuits of said one tube in a degenerative sense, and means for capacitatively coupling the tunable input of the preceding stage to the said resonant circuit of the said amplifier stage.

12. In combination in a radio receiver, an amplifier stage comprising a pair of tubes having a common input and output circuit, means for tuning the input circuit to a desired signal, a circuit resonant to an interruption frequency in at least one of said circuits, a source of interruption frequency coupled to said resonant circuit, means for periodically coupling the output and input circuits in a regenerative and degenerative sense, a preceding stage comprising a pair of tubes having a common tunable input circuit and an output circuit, means for periodically coupling the output and input circuits of said second pair of tubes in a regenerative and degenerative sense, and means for coupling the tunable input circuit of the preceding stage to the said resonant circuit of said amplifier stage.

13. In combination in a radio receiver, an amplifier stage comprising a pair of tubes having a common input and output circiut, means for tuning the input circuit to a desired signal, a circuit resonant to an interruption frequency in at least one of said circuits, a source of interruption frequency coupled to said resonant circuit, means for periodically coupling the output and input circuits in a regenerative and degenerative sense, a preceding stage comprising a pair of tubes having a common tunable input circuit and an output circuit coupled to the tunable input circuit of said amplifier stage, means for periodically coupling the output and input circuits of said second pair of tubes in a regenerative and degenerative sense, and means for coupling the tunable input circuit of the preceding stage to the said resonant circuit of said amplifier stage.

WALTER van B. ROBERTS.